US012684568B2

(12) United States Patent
Nakata

(10) Patent No.: US 12,684,568 B2
(45) Date of Patent: Jul. 14, 2026

(54) TERMINAL, BASE STATION AND METHOD

(71) Applicants: DENSO CORPORATION, Kariya-city (JP); TOYOTA JIDOSHA KABUSHIKI KAISHA, Toyota (JP)

(72) Inventor: Tsuneo Nakata, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 421 days.

(21) Appl. No.: 18/358,812

(22) Filed: Jul. 25, 2023

(65) Prior Publication Data

US 2023/0371023 A1 Nov. 16, 2023

Related U.S. Application Data

(63) Continuation of application No. PCT/JP2022/001001, filed on Jan. 13, 2022.

(30) Foreign Application Priority Data

Jan. 27, 2021 (JP) ................................. 2021-011326

(51) Int. Cl.
*H04W 72/1268* (2023.01)
*H04W 72/232* (2023.01)

(52) U.S. Cl.
CPC ..... *H04W 72/1268* (2013.01); *H04W 72/232* (2023.01)

(58) Field of Classification Search
CPC ........... H04W 72/1268; H04W 72/232; H04W 72/115
See application file for complete search history.

(56) References Cited

U.S. PATENT DOCUMENTS

2019/0045507 A1* 2/2019 Sorrentino ........ H04W 72/1268
2019/0082454 A1* 3/2019 Shi ......................... H04W 72/20

FOREIGN PATENT DOCUMENTS

JP 2019520733 A 7/2019
JP 6633219 B2 1/2020

OTHER PUBLICATIONS

International Search Report regarding International Patent Application No. PCT/JP2022/001001, dated Apr. 12, 2022.
3GPP TS 38.300 V16.1.0 (Mar. 2020), 3rdGeneration Partnership Project; Technical Specification Group Radio Access Network; NR; NR and NG-RAN Overall Description; Stage 2 (Release 16).

* cited by examiner

*Primary Examiner* — Kyaw Z Soe
(74) *Attorney, Agent, or Firm* — Harness, Dickey & Pierce, PLC

(57) ABSTRACT

A terminal according to an aspect of the present disclosure includes: a memory storing a program; and one or more processors configured to execute the program to: receive, from a base station, a radio resource control message including information for configuring a periodicity of a physical uplink shared channel resource for a configured grant transmission; and transmit on a physical uplink shared channel resource, to the base station, information indicating that the terminal is not to use the physical uplink shared channel resource in the period of the configured grant transmission.

6 Claims, 10 Drawing Sheets

TERMINAL, BASE STATION AND METHOD

CROSS-REFERENCE TO RELATED APPLICATIONS

This application is based on and claims the benefit of priority from Japanese Patent Application No. 2021-011326, filed on Jan. 27, 2021, the entire content of which is incorporated herein by reference.

BACKGROUND

1. Technical Field

The present disclosure relates to a terminal, a base station and a method.

2. Related Art

Mobile communication technologies have been proposed and standardized as technical specifications (TSs) in 3rd Generation Partnership Project (3GPP). Currently in particular, the 5th generation (5G) technology has been proposed and standardized.

SUMMARY

A terminal according to an aspect of the present disclosure includes: a memory storing a program; and one or more processors configured to execute the program to: receive, from a base station, a radio resource control message including information for configuring a periodicity of a physical uplink shared channel resource for a configured grant transmission; and transmit on a physical uplink shared channel resource, to the base station, information indicating that the terminal is not to use the physical uplink shared channel resource in the period of the configured grant transmission.

A base station according to an aspect of the present disclosure includes: a memory storing a program; and one or more processors configured to execute the program to: transmit, to a terminal, a radio resource control message including information for configuring a periodicity of a physical uplink shared channel resource for a configured grant transmission; and receive, from the terminal, information indicating that the terminal is not to use the physical shared uplink channel resource in the period of the configured grant transmission.

A method performed by a terminal according to an aspect of the present disclosure includes: receiving, from a base station, a radio resource control message including information for configuring a periodicity of a physical uplink shared channel resource for a configured grant transmission; and transmitting on a physical uplink shared channel resource, to the base station, information indicating that the terminal is not to use the physical uplink shared channel resource in the period of the configured grant transmission.

DETAILED DESCRIPTION OF THE PREFERRED EMBODIMENTS

Figure 1:
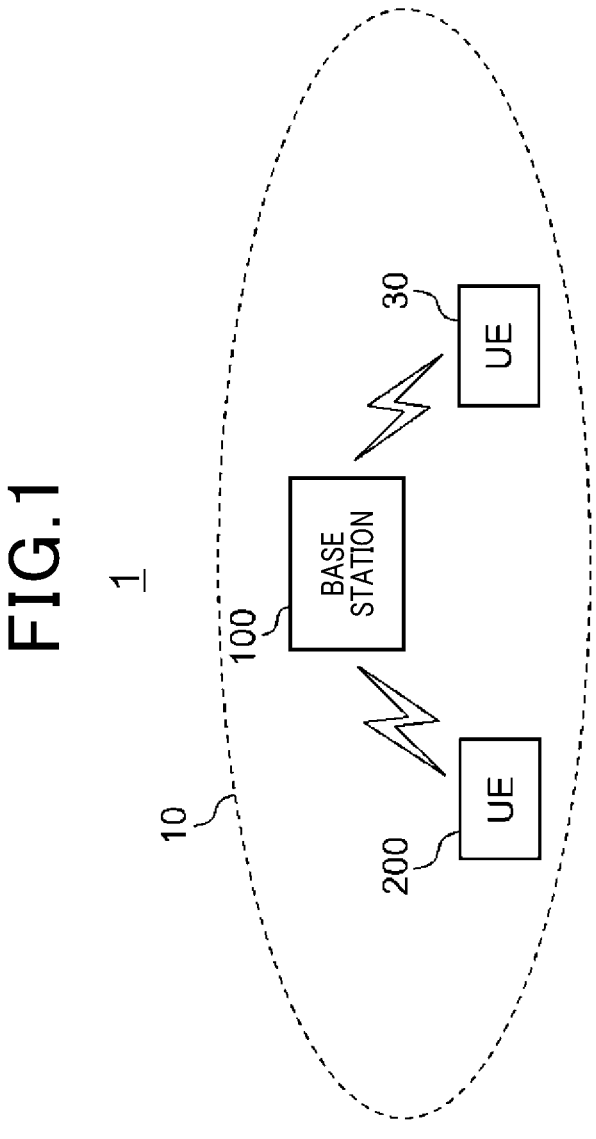
FIG. 1 is an explanatory diagram illustrating an example of a schematic configuration of a system according to an embodiment of the present disclosure.

For example, as described in 3GPP TS 38.300 V16.1.0 (2020-03), 5G has dynamic resource allocation in which individual uplink grants are used and continuous resource allocation in which no individual uplink grants are used. In particular, the continuous resource allocation is referred to as configured grant. The configured grant allows a user equipment (UE) to transmit data continuously using an uplink resource even without receiving any individual uplink grant.

For example, Japanese Patent No. 6633219 describes uplink semi-persistent scheduling (SPS) as the continuous resource allocation. In particular, according to Japanese Patent No. 6633219, before an SPS resource (that is, a transmission opportunity of uplink data), a UE transmits an intent-to-use indication or a non-intent-to-use indication of the resource.

According to the technology disclosed in Japanese Patent No. 6633219, a UE transmits the intent-to-use indication or the non-intent-to-use indication one or more subframes before a transmission opportunity of uplink data (for example, in the subframe immediately before the transmission opportunity). However, the inventor has revealed an issue that, even if a UE transmits a non-intent-to-use indication to a base station, for example, in the subframe immediately before the transmission opportunity, it is temporally difficult for the base station to allocate a resource for the transmission opportunity to another UE. Further, the inventor has revealed an issue that, in a case where a UE transmits an intent-to-use indication or a non-intent-to-use indication to a base station long before the transmission opportunity, the transmission of uplink data may have a delay unacceptable to the UE.

An object of the present disclosure is to provide a user equipment and a base station that make it possible to effectively use an uplink resource with an uplink transmission delay acceptable to the user equipment.

A user equipment according to an aspect of the present disclosure includes: a reception processing section configured to receive, from a base station, configuration information for continuously allocating an uplink resource to the user equipment; and a transmission processing section configured to transmit, to the base station, flag information indicating that the user equipment is not to use the uplink resource in a period after a configured offset.

A base station according to an aspect of the present disclosure includes: a transmission processing section configured to transmit, to a user equipment, configuration information for continuously allocating an uplink resource to the user equipment; and a reception processing section configured to receive, from the user equipment, flag information indicating that the user equipment is not to use the uplink resource in a period after a configured offset.

The present disclosure makes it possible to effectively use an uplink resource with an uplink transmission delay acceptable to a user equipment. Note that, the present disclosure may yield another advantageous effect instead of this advantageous effect or in addition to this advantageous effect.

Hereinafter, an embodiment of the present disclosure will be described in detail with reference to the appended drawings. In the present specification and the drawings, elements to which similar descriptions are applicable are denoted with the same reference signs, thereby omitting duplicate descriptions. Descriptions will be given in the following order:

1. Configuration of System
2. Configuration of Base Station
3. Configuration of User Equipment
4. Operation Examples
5. Modification Examples <1. Configuration of System>

An example of a configuration of a system 1 according to the embodiment of the present disclosure will be described with reference to FIG. 1. Referring to FIG. 1, the system 1 includes a base station 100, a user equipment (UE) 200, and a UE 30.

For example, the system 1 is a system compliant with technical specifications (TSs) in 3rd Generation Partnership Project (3GPP). More specifically, for example, the system 1 is a system compliant with the TSs of 5G or New Radio (NR). Naturally, the system 1 is not limited to this example.

(1) Base Station 100

The base station 100 is a node in a radio access network (RAN) and communicates with a UE (for example, UE 200) located within a coverage area 10 of the base station 100.

For example, the base station 100 communicates with a UE (for example, UE 200) using a RAN protocol stack. For example, the protocol stack includes a radio resource control (RRC) layer, a service data adaptation protocol (SDAP) layer, a packet data convergence protocol (PDCP) layer, a radio link control (RLC) layer, a medium access control (MAC) layer, and a physical (PHY) layer. Alternatively, the protocol stack does not have to include all of these layers, but may include some of these layers.

For example, the base station 100 is a next generation Node B (gNB). The gNB is a node that provides NR user plane and control plane protocol terminations towards a UE and is connected to a 5G core network (5GC) via an NG interface. Alternatively, the base station 100 may be an en-gNB.

The base station 100 may include a plurality of nodes. The plurality of nodes may include a first node that hosts higher layers included in the protocol stack and a second node that hosts lower layers included in the protocol stack. The higher layers may include the RRC layer, the SDAP layer, and the PDCP layer, while the lower layers may include the RLC layer, the MAC layer, and the PHY layer. The first node may be a central unit (CU) and the second node may be a distributed unit (DU). Note that the plurality of nodes may include a third node that performs lower processing of the PHY layer and the second node may perform higher processing of the PHY layer. The third node may be a radio unit (RU).

Alternatively, the base station 100 may be one of the plurality of nodes and may be connected to another unit of the plurality of nodes.

The base station 100 may be an integrated access and backhaul (IAB) donor or an IAB node.

(2) UE 200 and UE 30

The UE 200 and the UE 30 communicate with a base station. For example, the UE 200 communicates with the base station 100 when being located within the coverage area 10 of the base station 100. For example, the UE 30 also communicates with the base station 100 when being located within the coverage area 10 of the base station 100.

For example, the UE 200 and the UE 30 communicate with a base station (for example, base station 100) using the protocol stack.

2. Configuration of Base Station

Figure 2:
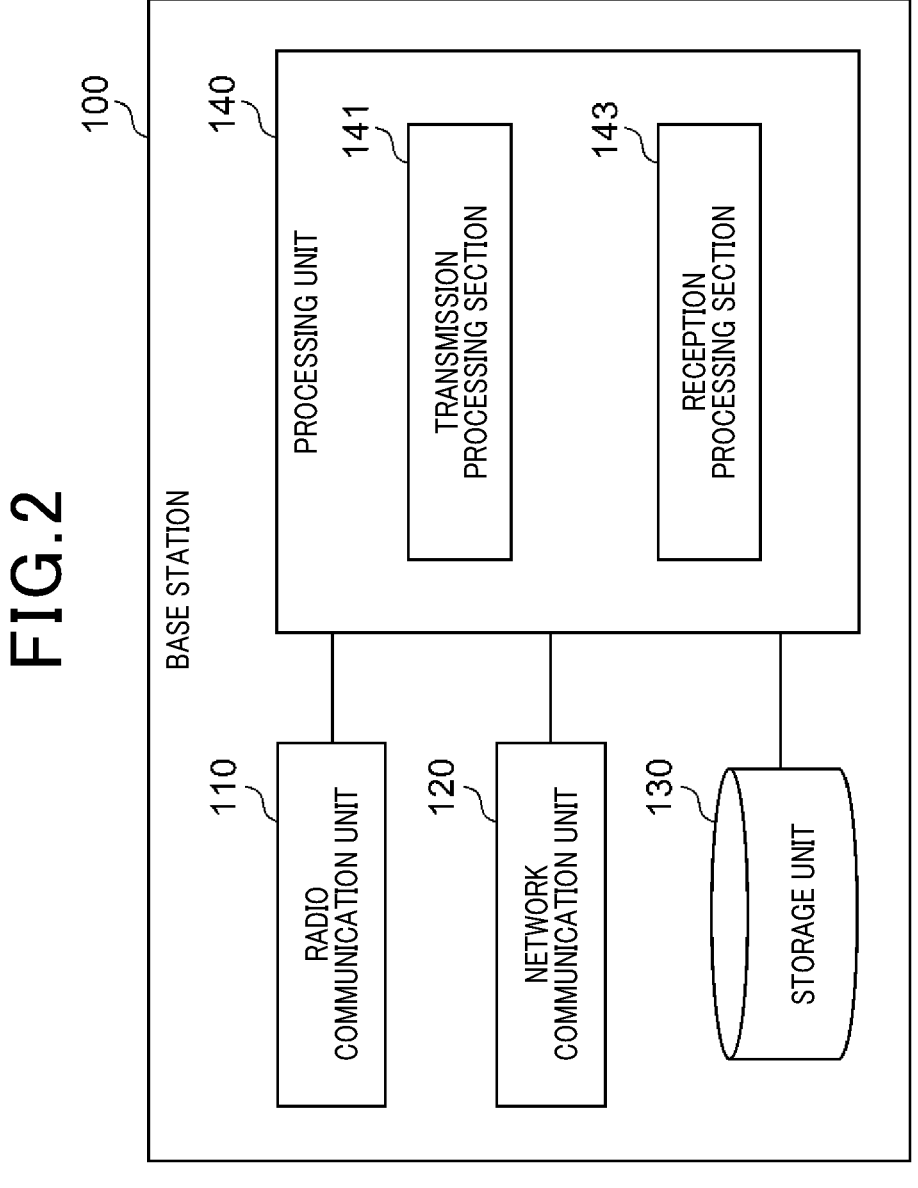
FIG. 2 is a block diagram illustrating an example of a schematic functional configuration of a base station according to the embodiment of the present disclosure.
Figure 3:
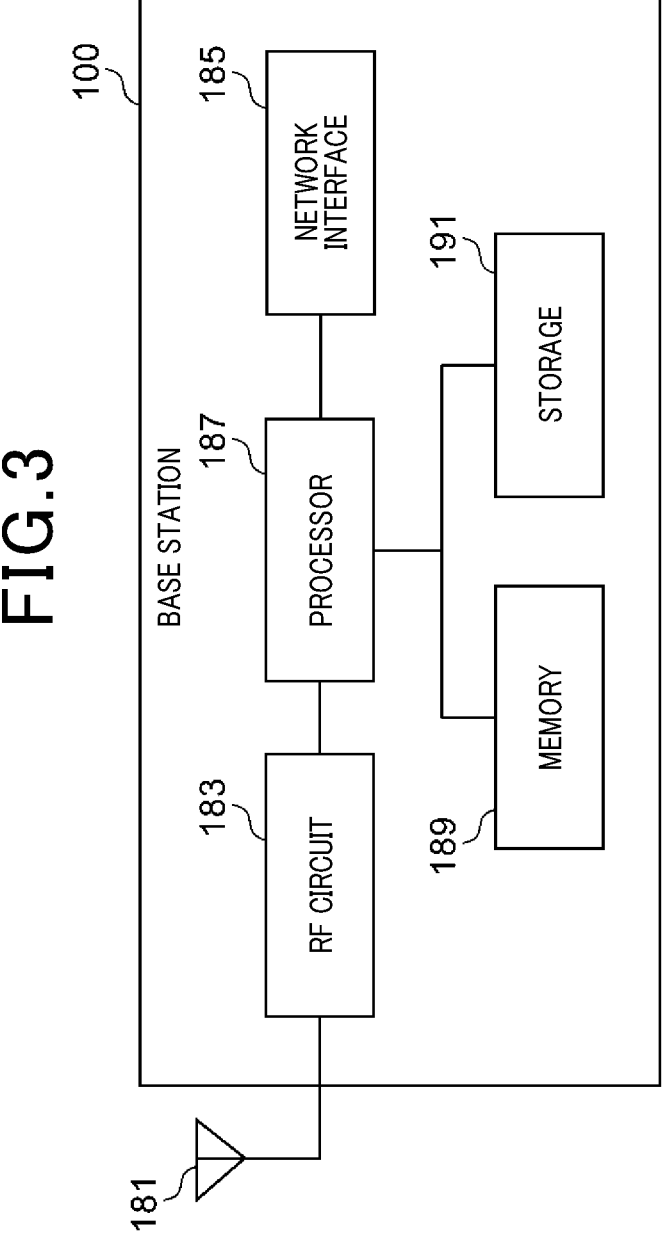
FIG. 3 is a block diagram illustrating an example of a schematic hardware configuration of the base station according to the embodiment of the present disclosure.

An example of a configuration of the base station 100 according to the embodiment of the present disclosure will be described with reference to FIGS. 2 and 3.

(1) Functional Configuration

First, an example of a functional configuration of the base station 100 according to the embodiment of the present disclosure will be described with reference to FIG. 2. Referring to FIG. 2, the base station 100 includes a radio communication unit 110, a network communication unit 120, a storage unit 130, and a processing unit 140.

The radio communication unit 110 wirelessly transmits and receives signals. For example, the radio communication unit 110 receives a signal from a UE and transmits a signal to the UE.

The network communication unit 120 receives a signal from a network and transmits a signal to the network.

The storage unit 130 stores various kinds of information.

The processing unit 140 provides various functions of the base station 100. The processing unit 140 includes a transmission processing section 141 and a reception processing section 143. Note that the processing unit 140 may further include another component in addition to these components. That is, the processing unit 140 may also perform an operation other than operations of these components. Specific operations of the transmission processing section 141 and the reception processing section 143 will be described in detail later.

For example, the processing unit 140 (transmission processing section 141 and reception processing section 143) communicates with a UE (for example, UE 200) via the radio communication unit 110. For example, the processing unit 140 communicates with another node (for example, a core network node or another base station) via the network communication unit 120.

(2) Hardware Configuration

Next, an example of a hardware configuration of the base station 100 according to the embodiment of the present disclosure will be described with reference to FIG. 3. Referring to FIG. 3, the base station 100 includes an antenna 181, an RF circuit 183, a network interface 185, a processor 187, a memory 189, and a storage 191.

The antenna 181 converts signals into radio waves and emits the radio waves into the air. In addition, the antenna 181 receives radio waves in the air and converts the radio waves into signals. The antenna 181 may include a transmitting antenna and a receiving antenna or may be a single antenna for transmission and reception. The antenna 181 may be a directional antenna and may include a plurality of antenna elements.

The RF circuit 183 performs analog processing on signals that are transmitted and received via the antenna 181. The RF circuit 183 may include a high-frequency filter, an amplifier, a modulator, a lowpass filter, and the like.

The network interface 185 is, for example, a network adaptor and transmits a signal to a network and receives a signal from the network.

The processor 187 performs digital processing on signals that are transmitted and received via the antenna 181 and the RF circuit 183. The digital processing includes processing of the RAN protocol stack. The processor 187 also performs processing on signals that are transmitted and received via the network interface 185. The processor 187 may include a plurality of processors or may be a single processor. The plurality of processors may include a baseband processor that performs the digital processing and one or more processors that perform other processing.

The memory 189 stores a program to be executed by the processor 187, parameters related to the program, and data related to the program. The memory 189 may include at least one of a read only memory (ROM), an erasable programmable read only memory (EPROM), an electrically erasable programmable read only memory (EEPROM), a random access memory (RAM), and a flash memory. The whole or part of the memory 189 may be included in the processor 187.

The storage 191 stores various kinds of information. The storage 191 may include at least one of a solid state drive (SSD) and a hard disk drive (HDD).

The radio communication unit 110 may be implemented by the antenna 181 and the RF circuit 183. The network communication unit 120 may be implemented by the network interface 185. The storage unit 130 may be implemented by the storage 191. The processing unit 140 may be implemented by the processor 187 and the memory 189.

Part or the whole of the processing unit 140 may be virtualized. In other words, part or the whole of the processing unit 140 may be implemented as a virtual machine. In this case, the part or the whole of the processing unit 140 may operate as a virtual machine on a physical machine (that is, hardware) including a processor, a memory, and the like and a hypervisor.

Given the hardware configuration described above, the base station 100 may include a memory (that is, memory 189) that stores a program and one or more processors (that is, processor 187) capable of executing the program and the one or more processors may be configured to execute the program to perform operations of the processing unit 140. The program may be a program for causing the processors to execute the operations of the processing unit 140.

3. Configuration of User Equipment

Figure 4:
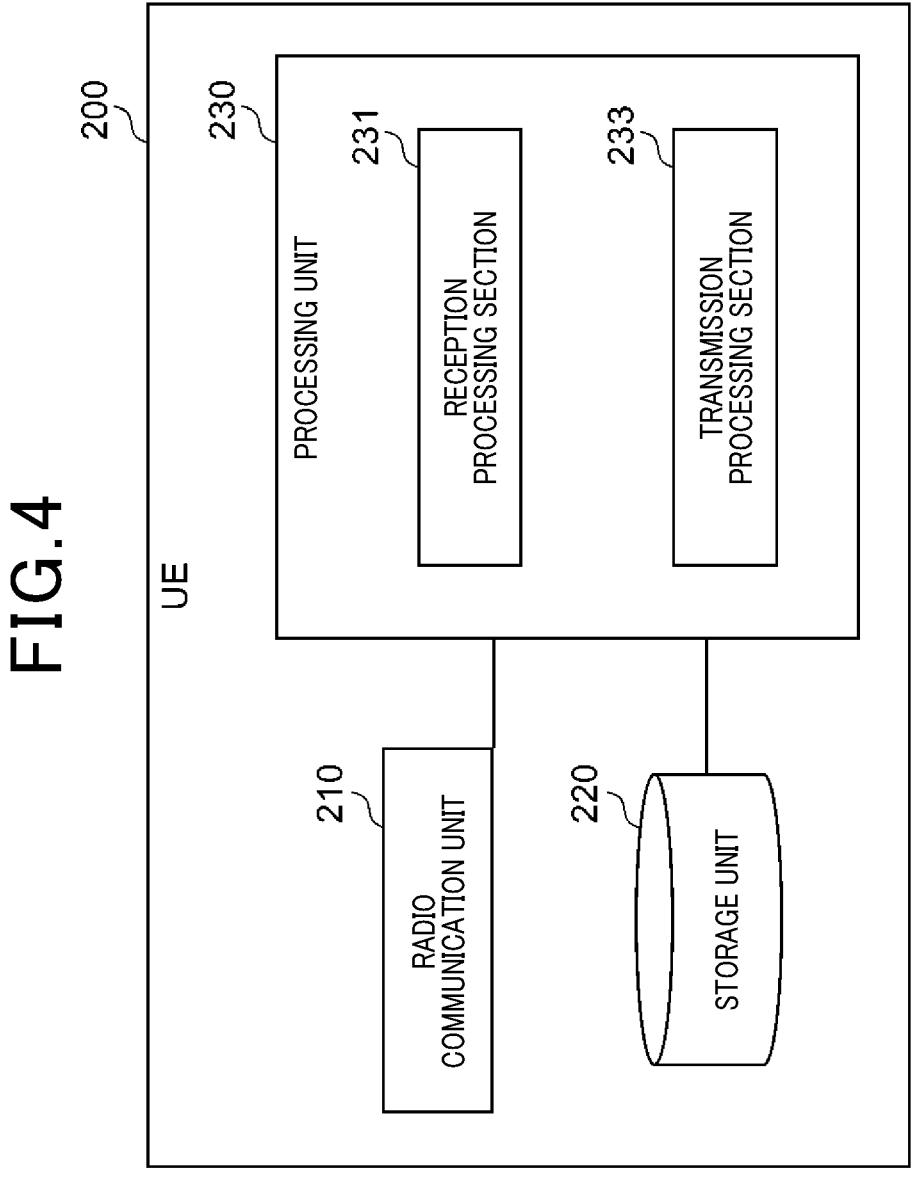
FIG. 4 is a block diagram illustrating an example of a schematic functional configuration of a user equipment according to the embodiment of the present disclosure.
Figure 5:
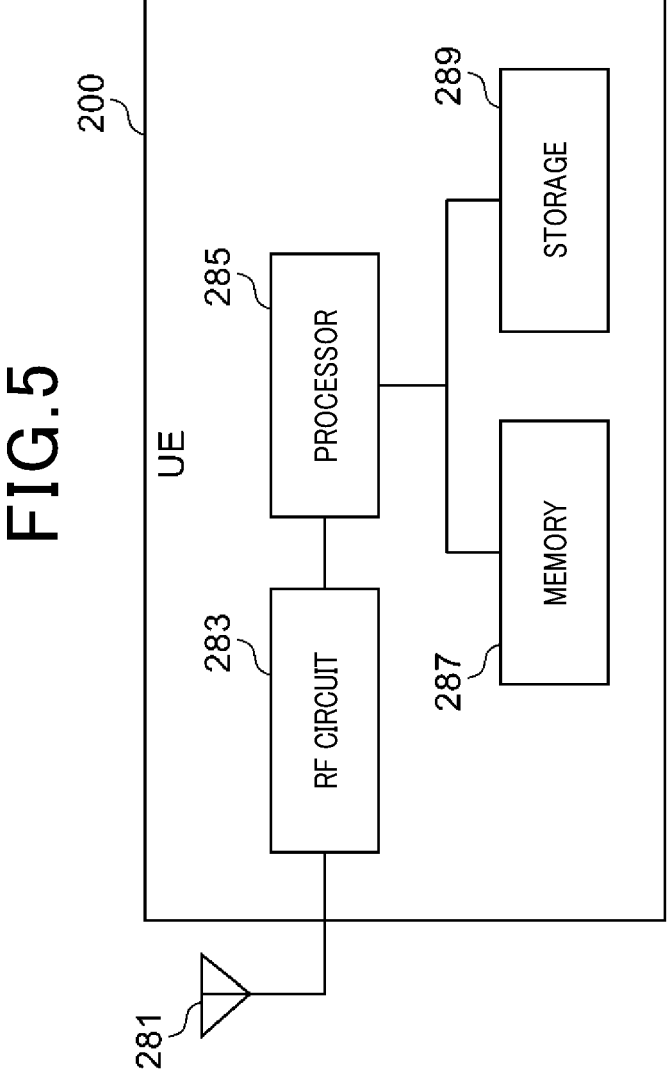
FIG. 5 is a block diagram illustrating an example of a schematic hardware configuration of the user equipment according to the embodiment of the present disclosure.

An example of a configuration of the UE 200 according to the embodiment of the present disclosure will be described with reference to FIGS. 4 and 5.
(1) Functional Configuration
First, an example of a functional configuration of the UE 200 according to the embodiment of the present disclosure will be described with reference to FIG. 4. Referring to FIG. 4, the UE 200 includes a radio communication unit 210, a storage unit 220, and a processing unit 230.

The radio communication unit 210 wirelessly transmits and receives signals. For example, the radio communication unit 210 receives a signal from a base station and transmits a signal to the base station. For example, the radio communication unit 210 receives a signal from another UE and transmits a signal to the other UE.

The storage unit 220 stores various kinds of information.

The processing unit 230 provides various functions of the UE 200. The processing unit 230 includes a reception processing section 231 and a transmission processing section 233. Note that the processing unit 230 may further include another component in addition to these components. That is, the processing unit 230 may also perform an operation other than operations of these components. Specific operations of the reception processing section 231 and the transmission processing section 233 will be described in detail later.

For example, the processing unit 230 (reception processing section 231 and transmission processing section 233) communicates with a base station (for example, base station 100) or another UE via the radio communication unit 210.
(2) Hardware Configuration
Next, an example of a hardware configuration of the UE 200 according to the embodiment of the present disclosure will be described with reference to FIG. 5. Referring to FIG. 5, the UE 200 includes an antenna 281, an RF circuit 283, a processor 285, a memory 287, and a storage 289.

The antenna 281 converts signals into radio waves and emits the radio waves into the air. In addition, the antenna 281 receives radio waves in the air and converts the radio waves into signals. The antenna 281 may include a transmitting antenna and a receiving antenna or may be a single antenna for transmission and reception. The antenna 281 may be a directional antenna and may include a plurality of antenna elements.

The RF circuit 283 performs analog processing on signals that are transmitted and received via the antenna 281. The RF circuit 283 may include a high-frequency filter, an amplifier, a modulator, a lowpass filter, and the like.

The processor 285 performs digital processing on signals that are transmitted and received via the antenna 281 and the RF circuit 283. The digital processing includes processing of the RAN protocol stack. The processor 285 may include a plurality of processors or may be a single processor. The plurality of processors may include a baseband processor that performs the digital processing and one or more processors that perform other processing.

The memory 287 stores a program to be executed by the processor 285, parameters related to the program, and data related to the program. The memory 287 may include at least one of a ROM, an EPROM, an EEPROM, a RAM, and a flash memory. The whole or part of the memory 287 may be included in the processor 285.

The storage 289 stores various kinds of information. The storage 289 may include at least one of an SSD and an HDD.

The radio communication unit 210 may be implemented by the antenna 281 and the RF circuit 283. The storage unit 220 may be implemented by the storage 289. The processing unit 230 may be implemented by the processor 285 and the memory 287.

The processing unit 230 may be implemented by a system on a chip (SoC) including the processor 285 and the memory 287. The SoC may include the RF circuit 283 and the radio communication unit 210 may also be implemented by the SoC.

Given the hardware configuration described above, the UE 200 may include a memory (that is, memory 287) that stores a program and one or more processors (that is, processor 285) capable of executing the program and the one or more processors may be configured to execute the program to perform operations of the processing unit 230. The program may be a program for causing the processors to execute the operations of the processing unit 230.

4. Operation Examples

Figure 7:
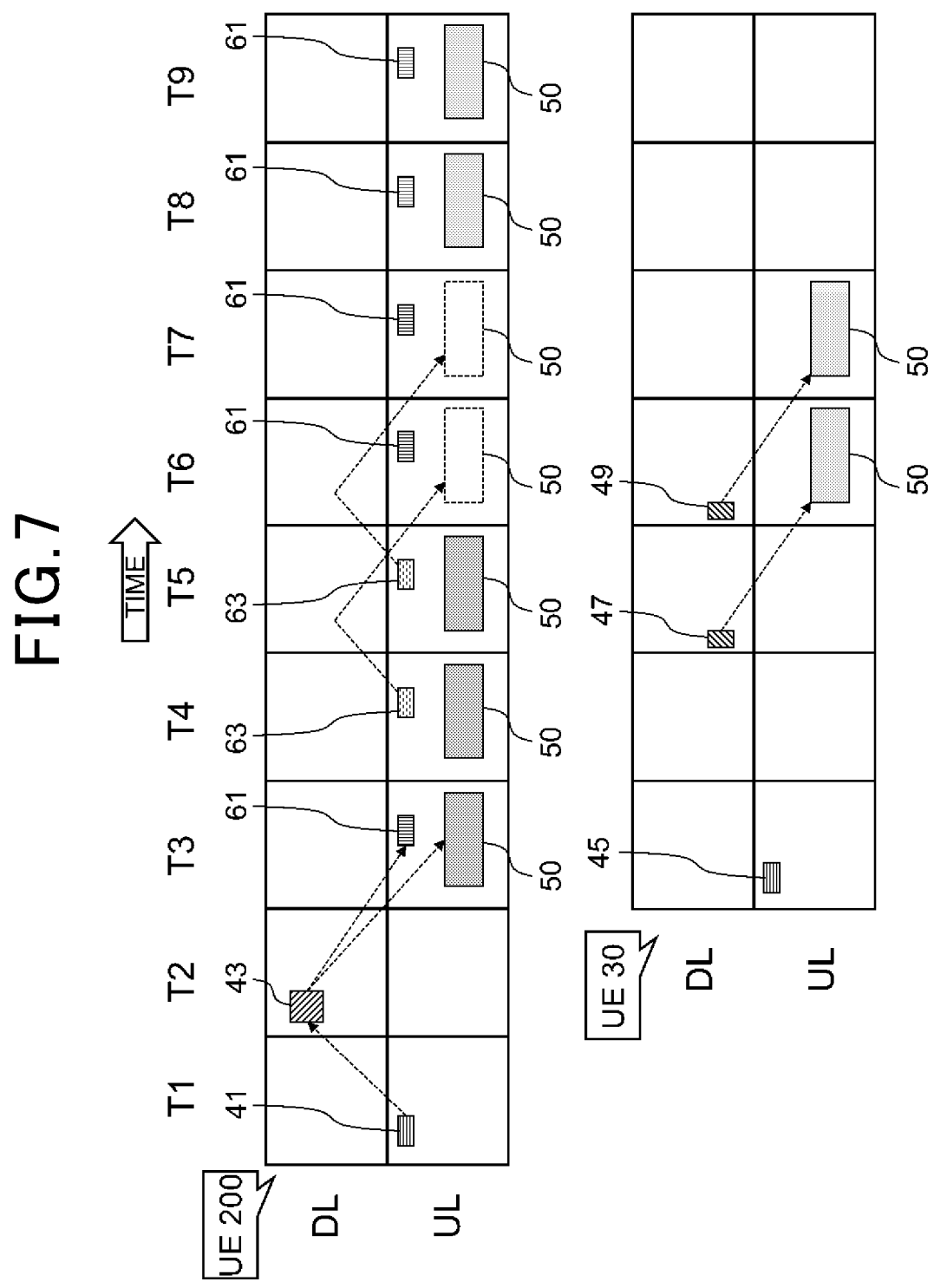
FIG. 7 is a diagram for explaining an example of reuse of the uplink resource according to the embodiment of the present disclosure.
Figure 8:
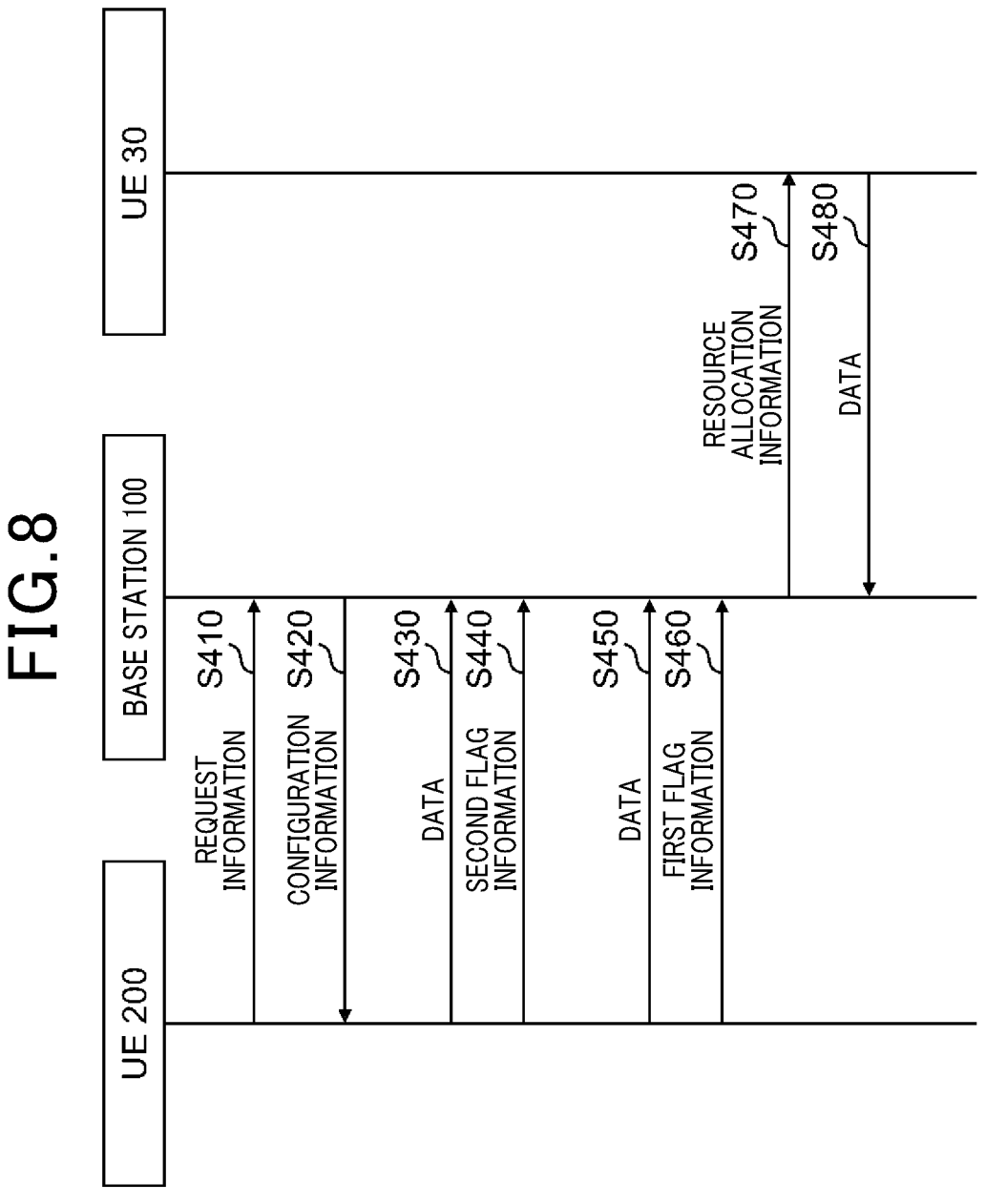
FIG. 8 is a sequence diagram for explaining an example of a schematic flow of processing according to the embodiment of the present disclosure.

Examples of operations of the base station 100 and the UE 200 according to the embodiment of the present disclosure will be described with reference to FIGS. 6 to 8.

(1) Transmission and Reception of Configuration Information for Uplink Resource

The base station 100 (transmission processing section 141) transmits, to the UE 200, configuration information for continuously allocating an uplink resource to the UE 200. The UE 200 (reception processing section 231) receives the configuration information from the base station 100.

Configuration Information

For example, the configuration information is configuration information for a configured grant. For example, the configuration information includes allocation type information indicating a resource allocation type, periodicity information indicating the periodicity of uplink transmissions with no uplink grants, repetition information indicating the number of repetitions, and the like. Further, for example, the configuration information includes resource information indicating the uplink resource (for example, a time domain offset, time domain allocation, frequency domain allocation, and the like).

Transmission Condition

For example, the UE 200 (transmission processing section 233) transmits, to the base station 100, request information for requesting the continuous allocation of an uplink resource (for example, configured grant). The base station 100 (reception processing section 143) receives the request information. For example, the base station 100 (transmission processing section 141) transmits the configuration information to the UE 200 in response to the request information.

Transmission and Reception Techniques

For example, the base station 100 (transmission processing section 141) transmits a radio resource control (RRC) message including the configuration information to the UE 200. The UE 200 (reception processing section 231) receives the RRC message including the configuration information from the base station 100. That is, the configured grant is a Type 1 configured grant.

(2) Use of Uplink Resource

For example, the UE 200 (transmission processing section 233) transmits data to the base station 100 using the uplink resource.

(3) Transmission of Flag Information

In particular, the UE 200 (transmission processing section 233) transmits, to the base station 100, flag information (that will be referred to as "first flag information" below) indicating that the UE 200 is not to use the uplink resource in a period after a configured offset. The base station 100 (reception processing section 143) receives the first flag information from the UE 200.

Flag Information

For example, the first flag information is flag information indicating whether or not the UE 200 is to use the uplink resource in the period after the configured offset. In particular, the first flag information has a first value indicating that the UE 200 is not to use the uplink resource.

For example, the UE 200 (transmission processing section 233) also transmits other flag information (that will be referred to as "second flag information" below) to the base station 100. The second flag information indicates that the UE 200 is to use the uplink resource in the period after the configured offset. For example, the second flag information is flag information indicating whether or not the UE 200 is to use the uplink resource in the period after the configured offset. In particular, the second flag information has a second value indicating that the UE 200 is to use the uplink resource.

For example, in a case where the UE 200 (transmission processing section 233) transmits the first flag information, the UE 200 (transmission processing section 233) does not transmit data to the base station 100 using the uplink resource in the period. This, for example, makes it possible to actually release the uplink resource in the period. In contrast, in a case where the UE 200 (transmission processing section 233) transmits the second flag information, the UE 200 (transmission processing section 233) transmits data to the base station 100 using the uplink resource in the period.

As an example, the first flag information and the second flag information are 1-bit information. The first flag information has one of the values of 0 and 1 and the second flag information has the other of the values of 0 and 1. However, the first flag information and the second flag information are not naturally limited to this example.

Transmission Condition

For example, the UE 200 (transmission processing section 233) transmits the first flag information to the base station 100 when a buffer for an uplink has no data.

For example, the UE 200 (transmission processing section 233) transmits the second flag information to the base station 100 when the buffer for the uplink has data.

This, for example, makes it possible to release the uplink resource when the buffer has no data.

Transmission and Reception Techniques

For example, the UE 200 (transmission processing section 233) transmits the first flag information or the second flag information to the base station 100 in a slot having the uplink resource.

For example, the UE 200 (transmission processing section 233) transmits the first flag information or the second flag information to the base station 100 using another uplink resource different from the uplink resource described above. This, for example, makes it possible to completely release the uplink resource when data is not transmitted using the uplink resource.

For example, the base station 100 (transmission processing section 141) transmits, to the UE 200, other configuration information for allocating the other uplink resource to the UE 200. The UE 200 (reception processing section 231) receives the other configuration information from the base station 100.

For example, the UE 200 (transmission processing section 233) transmits the first flag information or the second flag information to the base station 100 on a physical uplink control channel (PUCCH). Alternatively, the UE 200 (transmission processing section 233) may transmit the first flag information or the second flag information to the base station 100 on a physical channel for the first flag information and the second flag information.

Configured Offset

For example, the configured offset is an offset configured by the base station 100. That is, the base station 100 (processing unit 140) determines and configures an offset corresponding to the first flag information and the second flag information.

For example, the base station 100 (transmission processing section 141) transmits, to the UE 200, offset information indicating the configured offset. The UE 200 (reception processing section 231) receives the offset information from the base station 100. For example, the offset information is included in the configuration information.

For example, the configured offset is two or more slots. For example, each of the two or more slots includes fourteen symbols. This, for example, makes it possible to allocate the uplink resource to another UE.

For example, the configured offset is an offset determined depending on a delay acceptable to the UE 200. For example, the UE 200 (transmission processing section 233) transmits, to the base station 100, delay information indicating a delay acceptable to the UE 200. As an example, the delay information is included in the request information. The base station 100 (processing unit 140) determines the offset on the basis of the delay information. Specifically, for example, the base station 100 (processing unit 140) determines the offset to be greater than or equal to two slots and less than or equal to the delay acceptable to the UE 200. The base station 100 (processing unit 140) may determine the offset by further taking into consideration the time necessary for scheduling in the base station 100. This, for example, makes the uplink transmission delay actually acceptable to the UE 200.

Period

For example, the length of the period after the configured offset may be predefined length.

As an example, the length of the period is one slot.

Reuse of Uplink Resource

For example, the base station 100 (processing unit 140) allocates at least part of the uplink resource in the period after the configured offset to another UE (for example, UE 30).

For example, the base station 100 (transmission processing section 141) transmits, to another UE (for example, UE 30), resource allocation information for allocating the at least part of the uplink resource to the other UE. The other UE transmits data to the base station 100 using the at least part of the uplink resource. For example, the resource allocation information is downlink control information (DCI).

This, for example, causes the uplink resource to be effectively used actually.

Specific Example (Transmission of Flag Signal)

Figure 6:
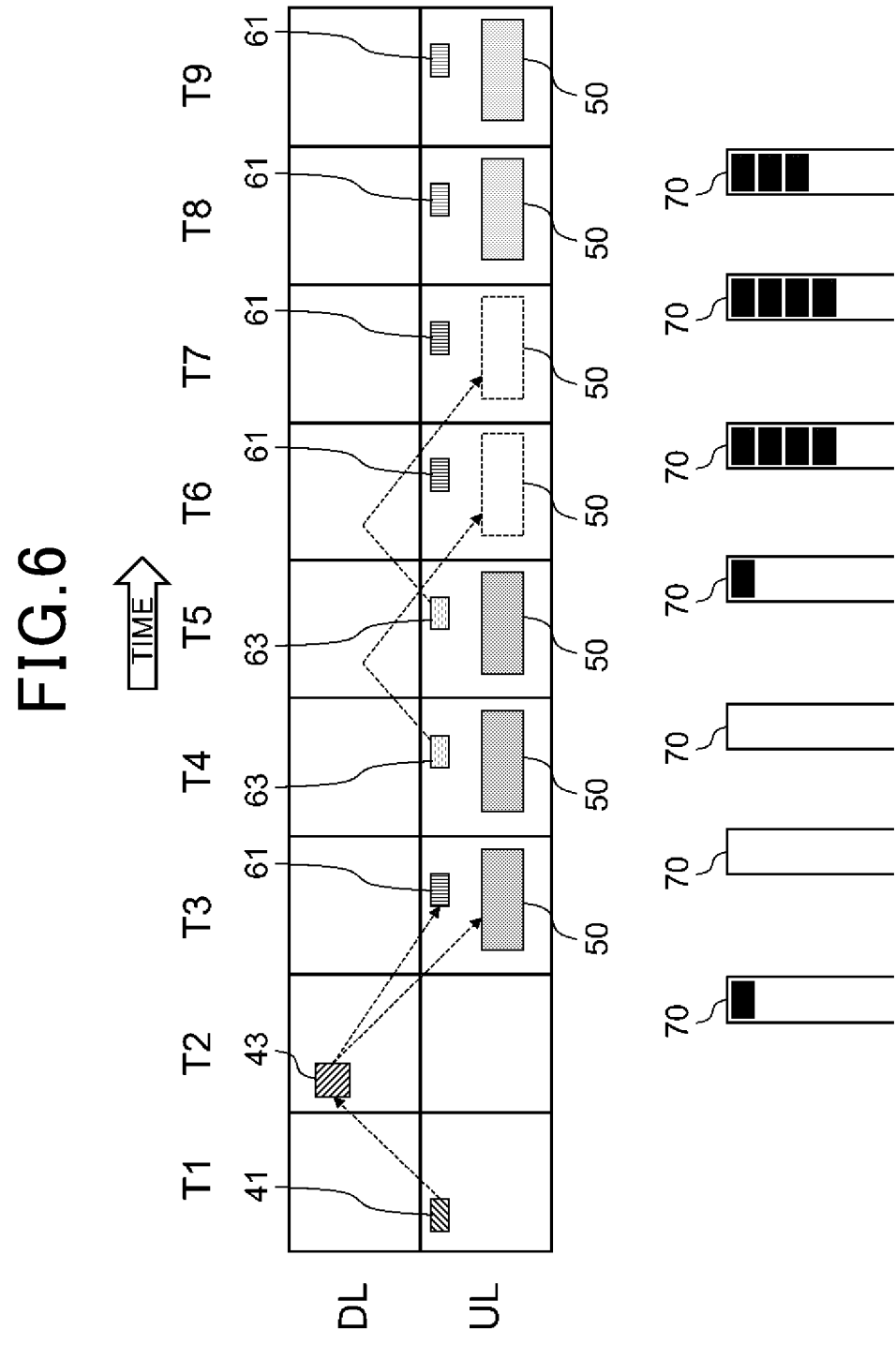
FIG. 6 is a diagram for explaining examples of an uplink resource and flag information according to the embodiment of the present disclosure.

Referring to the example of FIGS. 6, T1 to T9 are illustrated in a time domain. As an example, each of T1 to T9 is a slot. In addition, a downlink (DL) transmission and an uplink (UL) transmission are illustrated for each of T1 to T9. Further, the presence of data in a buffer 70 is also illustrated.

In T1, the UE 200 transmits, to the base station 100 in an uplink (UL), request information 41 for requesting the continuous allocation of an uplink resource.

In T2, in response to the request information 41, the base station 100 transmits, to the UE 200 in a downlink (DL), configuration information 43 for continuously allocating an uplink resource 50 to the UE 200.

In T3, the UE 200 transmits data using the uplink resource 50.

Immediately before T3, the buffer 70 for the uplink has data. In T3, the UE 200 therefore transmits, to the base station 100, flag information 61 (that is, the second flag information) indicating that the UE 200 is to use the uplink resource in the period after the configured offset. In this example, the configured offset is two slots and the length of the period is one slot.

In contrast, immediately before T4, the buffer 70 for the uplink has no data. In T4, the UE 200 therefore transmits, to the base station 100, flag information 63 (that is, the first flag information) indicating that the UE 200 is not to use the uplink resource in the period after the configured offset. The UE 200 does not use the uplink resource 50 in T6. That is, the uplink resource 50 in T6 is released.

Similarly, in T5, the UE 200 transmits the flag information 63 to the base station 100. The UE 200 does not use the uplink resource 50 in T7. That is, the uplink resource 50 in T7 is released.

Immediately before T6, the buffer 70 for the uplink has data. In T6, the UE 200 therefore transmits the flag information 61 to the base station 100. Even in or after T7, the UE 200 transmits the flag information 61 to the base station 100. Thus, in or after T8, the uplink resource 50 is not released and is used by the UE 200.

In this example, the configured offset is two slots and the uplink transmission delay is two slots.

Note that T1 to T9 are illustrated as if T1 to T9 were contiguous in the example of FIG. 6, but T1 to T9 do not necessarily have to be contiguous. Any adjacent two of T1 to T9 may be contiguous or discontiguous.

Specific Example (Reuse of Uplink Resource)

Referring to the example of FIG. 7, the uplink resource 50 in T6 and the uplink resource 50 in T7 are released as described with reference to the example of FIG. 6. The base station 100 therefore allocates the uplink resource 50 in T6 and the uplink resource 50 in T7 to the UE 30. In T5, the base station 100 transmits, to the UE 30, resource allocation information 47 for allocating the uplink resource 50 in T6 to the UE 30. In T6, the base station 100 transmits, to the UE 30, resource allocation information 49 for allocating the uplink resource 50 in T7 to the UE 30. The UE 30 transmits data to the base station 100 using the uplink resource 50 in T6 and the uplink resource 50 in T7.

As described above, the first flag signal is transmitted and the uplink resource is released and reused. This, for example, makes it possible to effectively use an uplink resource with an uplink transmission delay acceptable to the UE 200.

(4) Flow of Processing

An example of processing according to the embodiment of the present disclosure will be described with reference to FIG. 8.

The UE 200 transmits, to the base station 100, request information for requesting the continuous allocation of an uplink resource (S410). The base station 100 receives the request information.

The base station 100 transmits, to the UE 200, configuration information for continuously allocating an uplink resource to the UE 200 (S420). The UE 200 receives the configuration information from the base station 100.

The UE 200 transmits data to the base station 100 using the uplink resource (S430). Further, the UE 200 transmits, to the base station 100, second flag information indicating that the UE 200 is to use the uplink resource in the period after a configured offset (S440). The base station 100 receives the data and the second flag information.

The UE 200 transmits data to the base station 100 using the uplink resource (S450). Further, the UE 200 transmits, to the base station 100, first flag information indicating that the UE 200 is not to use the uplink resource in the period after the configured offset (S460). The base station 100 receives the data and the first flag information.

On the basis of the first flag information, the base station 100 transmits, to the UE 30, resource allocation information for allocating, to the UE 30, at least part of the uplink resource in the period after the configured offset (S470). The UE 30 receives the resource allocation information.

The UE 30 transmits data to the base station 100 using the at least part of the uplink resource (S480).

5. Modification Examples

First to tenth modification examples of the embodiment of the present disclosure will be described with reference to FIGS. 9 and 10. Note that two or more of these modification examples may be combined as long as inconsistency is avoided.

(1) First Modification Example: Transmission and Reception of Configuration Information for Uplink Resource (Transmission and Reception Techniques)

In the above-described example of the embodiment of the present disclosure, the base station 100 (transmission processing section 141) transmits, to the UE 200, configuration information for continuously allocating an uplink resource to the UE 200. For example, the base station 100 (transmission processing section 141) transmits a radio resource control (RRC) message including the configuration information to the UE 200. However, the embodiment of the present disclosure is not limited to this example.

In the first modification example of the embodiment of the present disclosure, the configuration information may include first configuration information and second configuration information. The base station 100 (transmission processing section 141) may transmit an RRC message including the first configuration information to the UE 200 and may transmit DCI including the second configuration information to the UE 200. The UE 200 (reception processing section 131) may receive the RRC message from the base station 100 and may receive the DCI from the base station 100. That is, the configured grant may be a Type 2 configured grant.

The first configuration information may include the allocation type information, the periodicity information, the repetition information, and the like. The second configuration information may include the resource information and the like.

The DCI may activate the continuous allocation of the uplink resource.

This, for example, enables the base station 100 to allocate an uplink resource more flexibly.

(2) Second Modification Example: Transmission and Reception of Configuration Information for Uplink Resource (Transmission and Reception Techniques)

In the above-described example in the embodiment of the present disclosure, the uplink resources continuously allocated to the UE 200 are the same in the respective slots, for example, as illustrated in FIG. 6. However, the embodiment of the present disclosure is not limited to this example.

In the second modification example of the embodiment of the present disclosure, the uplink resources continuously allocated to the UE 200 may be different depending on time. As an example, the uplink resources may be different between slots.

Figure 9:
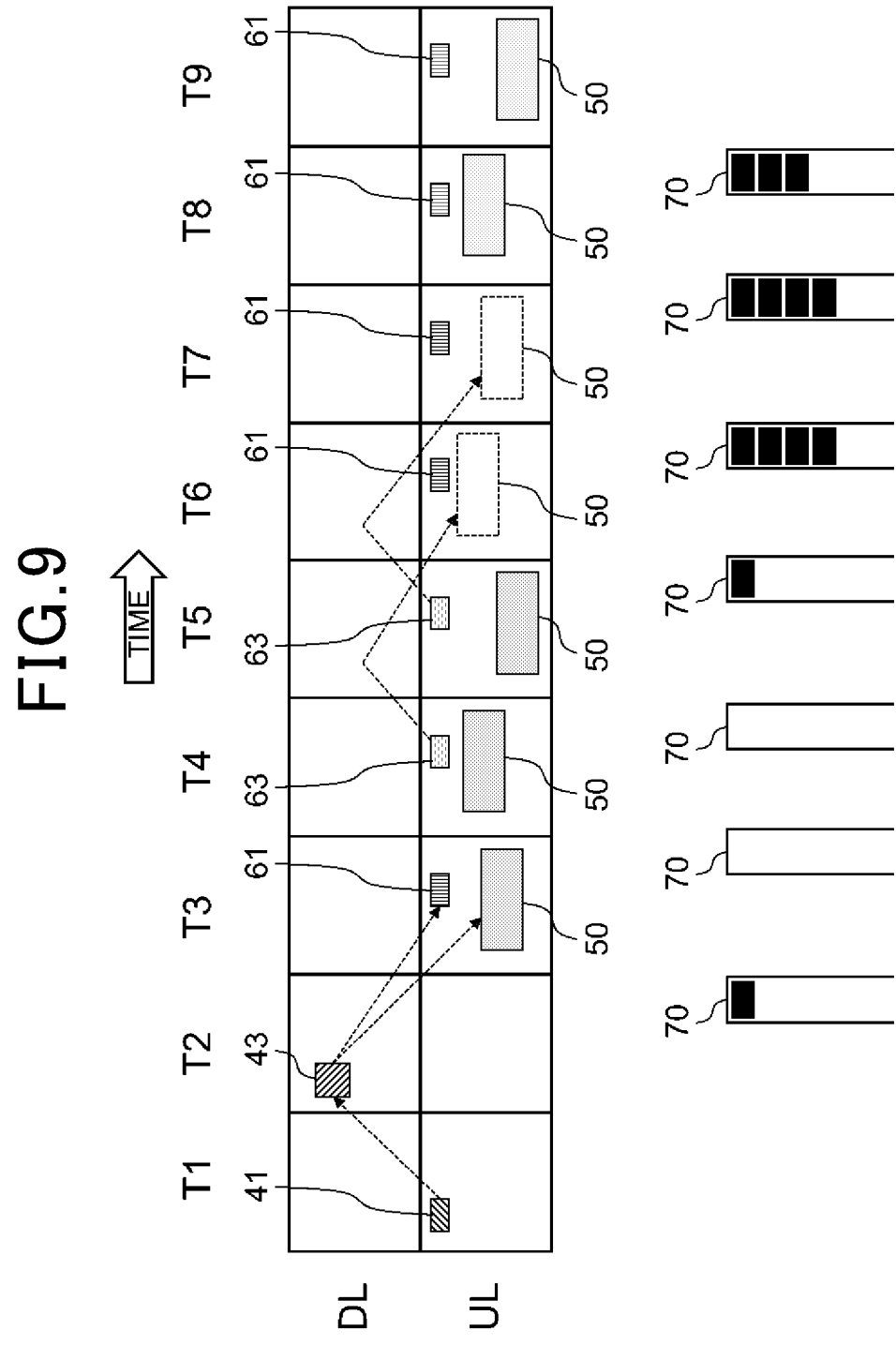
FIG. 9 is a diagram for explaining an example of an uplink resource according to a second modification example of the embodiment of the present disclosure.

Referring to the example of FIG. 9, as an example, the uplink resources 50 continuously allocated to the UE 200 may be located at frequency locations (for example, different resource blocks) that are different between slots.

Note that the uplink resources may be located at time locations (for example, different symbols) that are different between slots. Alternatively, the uplink resources may be located at time locations (for example, different symbols) and frequency locations (for example, different resource blocks) that are different between slots.

The uplink resources may be different in size between slots in at least one of the time domain and the frequency domain.

This, for example, enables the base station 100 to allocate an uplink resource more flexibly.

(3) Third Modification Example: Transmission of Flag Information (Transmission and Reception Techniques)

In the above-described example of the embodiment of the present disclosure, the UE 200 (transmission processing section 233) transmits the first flag information or the second flag information to the base station 100 using another uplink resource different from the uplink resource continuously allocated to the UE 200. However, the embodiment of the present disclosure is not limited to this example.

In the third modification example of the embodiment of the present disclosure, the UE 200 (transmission processing section 233) may transmit the first flag information or the second flag information to the base station 100 using part of the uplink resource in a slot. This, for example, eliminates the necessity of a redundant resource.

The UE 200 (transmission processing section 233) may transmit data to the base station 100 using the remainder of the uplink resource in the slot.

The part of the uplink resource in the slot may be a resource at a specific location in the uplink resource in the slot. This, for example, enables the UE 200 to actually use part of the uplink resource to transmit the flag information. As an example, the specific location may be a location predefined in the uplink resource. As another example, the base station 100 (transmission processing section 141) may transmit, to the UE 200, resource location information indicating the specific location. The UE 200 (reception processing section 231) may receive the resource location information. The resource location information may be included in the configuration information.

The resource allocation information for allocating the at least part of the uplink resource to another UE (for example, UE 30) may indicate that the at least part of the uplink resource is a reuse resource. This, for example, makes it possible to prevent the other UE from using the part of the uplink resource.

The UE 200 (transmission processing section 233) may transmit the first flag information or the second flag information to the base station 100 on a physical uplink shared channel (PUSCH). Alternatively, the UE 200 (transmission processing section 233) may transmit the first flag information or the second flag information to the base station 100 on a physical channel for the first flag information and the second flag information.

Figure 10:
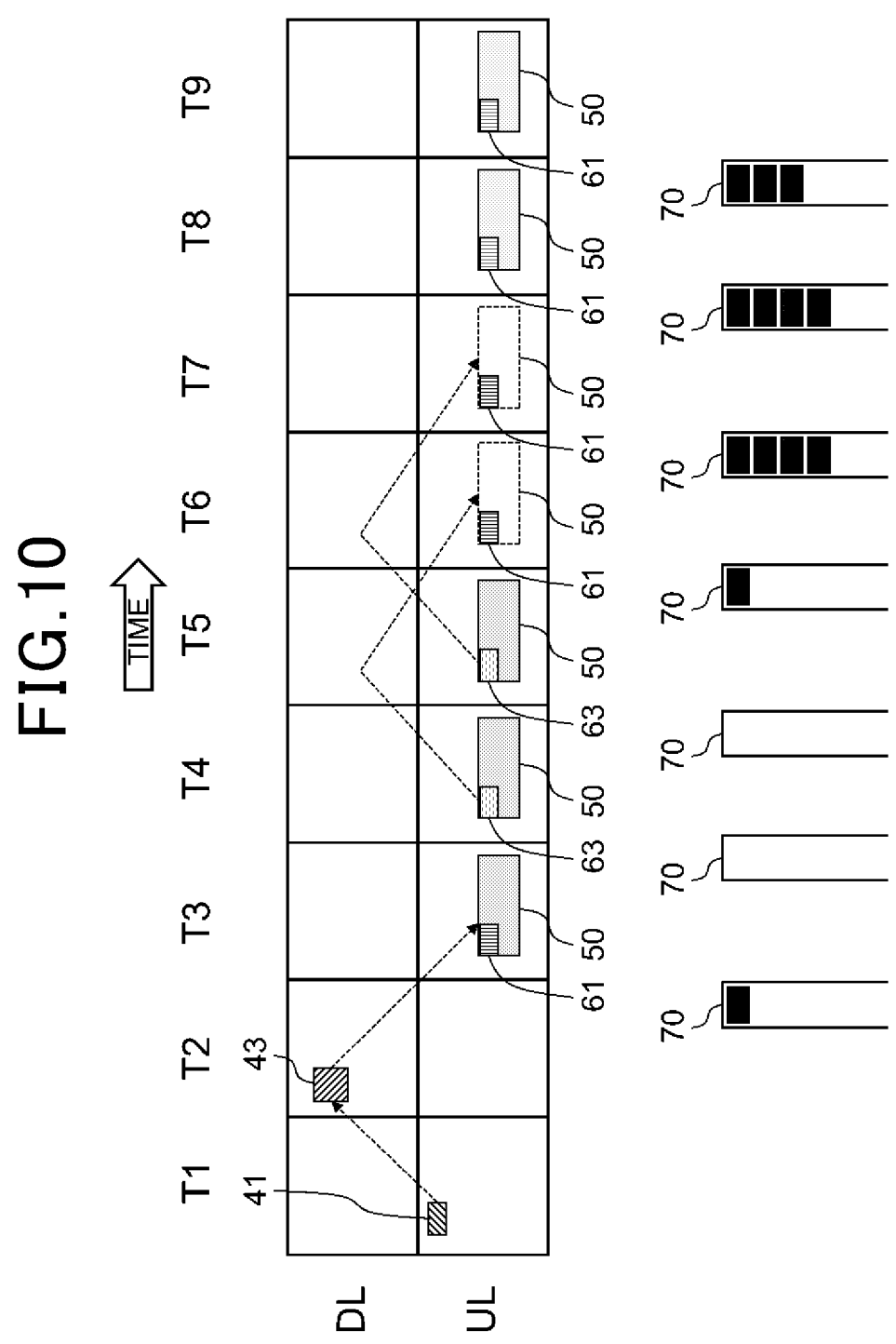
FIG. 10 is a diagram for explaining an example of flag information according to a third modification example of the embodiment of the present disclosure.

Referring to the example of FIG. 10, the UE 200 may transmit the flag information 61 or the flag information 63 to the base station 100 using a resource at a specific location (for example, an edge) in the uplink resource 50.

(4) Fourth Modification Example: Transmission of Flag Information (Offset)

In the above-described example of the embodiment of the present disclosure, the configured offset is two or more slots. However, the embodiment of the present disclosure is not limited to this example.

In the fourth modification example of the embodiment of the present disclosure, the configured offset may be an offset up to an N-th slot having the uplink resource continuously allocated to the UE 200. N may be a configured integer and may be greater than or equal to 1. That is, the configured offset may be an offset that focuses on only a slot having the uplink resource.

This, for example, allows the first flag information to indicate that an uplink resource which definitely exists is not to be used. In other words, it is possible to prevent the first flag information from indicating that an uplink resource which does not exist in the first place is not to be used.

(5) Fifth Modification Example: Transmission of Flag Information (Offset)

In the above-described example of the embodiment of the present disclosure, the configured offset is an offset configured by the base station 100. That is, the base station 100 determines and configures an offset corresponding to the first flag information and the second flag information. However, the embodiment of the present disclosure is not limited to this example.

In the fifth modification example of the embodiment of the present disclosure, the configured offset may be an offset configured by the UE 200 itself. That is, the UE 200 (processing unit 140) may determine and configure an offset corresponding to the first flag information and the second flag information.

The UE 200 (transmission processing section 233) may transmit, to the base station 100, offset information indicating the configured offset. The base station 100 (reception processing section 143) may receive the offset information from the UE 200. As an example, the offset information may be included in the first flag information and the second flag information.

(6) Sixth Modification Example: Transmission of Flag Information (Offset)

In the above-described example of the embodiment of the present disclosure, the configured offset is an offset configured by the base station 100. Further, in the fifth modification example of the embodiment of the present disclosure, the configured offset is an offset configured by the UE 200 itself. However, the embodiment of the present disclosure is not limited to this example.

In the sixth modification example of the embodiment of the present disclosure, the configured offset may be a preconfigured offset. That is, the UE 200 may store in advance the offset information indicating the configured offset.

This, for example, makes it possible to reduce overhead brought about by transmitting the offset information.

(7) Seventh Modification Example: Transmission of Flag Information (Period)

In the above-described example of the embodiment of the present disclosure, the length of the period after the configured offset is predefined length. However, the embodiment of the present disclosure is not limited to this example.

In the seventh modification example of the embodiment of the present disclosure, the length of the period after the configured offset may be configured.

Configuration by Base Station 100

The length of the period may be configured by the base station 100. That is, the base station 100 (processing unit 140) may determine and configure the length of the period.

The base station 100 (transmission processing section 141) may transmit, to the UE 200, period information indicating the length of the period. The UE 200 (reception processing section 231) may receive the period information from the base station 100. The period information may be included in the configuration information.

Configuration by UE 200

Alternatively, the length of the period may be configured by the UE 200 itself. That is, the UE 200 (processing unit 230) may determine and configure the length of the period.

The UE 200 (transmission processing section 233) may transmit, to the base station 100, the period information indicating the length of the period. The base station 100 (reception processing section 143) may receive the period information from the UE 200. As an example, the period information may be included in the first flag information and the second flag information.

Length of Period

The length of the period may be length that is determined depending on a delay acceptable to the UE 200. In a case where the base station 100 configures the length of the period, the base station 100 may determine and configure the length of the period on the basis of the delay information. The period may be a period of one or more slots.

Alternatively, the period may be a period including M slots each having the uplink resource. M may be a configured integer and may be greater than or equal to 1. That is, the period may be a period that focuses on only a slot having the uplink resource. This, for example, allows the first flag information to indicate that an uplink resource which definitely exists is not to be used.

(8) Eighth Modification Example: Transmission of Flag Information (Flag Information)

In the above-described example of the embodiment of the present disclosure, the UE 200 (transmission processing section 233) also transmits the second flag information (that is, other flag information indicating that the UE 200 is to use the uplink resource in the period after the configured offset) to the base station 100 in addition to the first flag information. However, the embodiment of the present disclosure is not limited to this example.

In the eighth modification example of the embodiment of the present disclosure, the UE 200 (transmission processing section 233) does not have to transmit the second flag information. That is, the UE 200 (transmission processing section 233) may transmit the first flag information alone as the flag information.

(9) Ninth Modification Example: Transmission of Flag Information

In the ninth modification example of the embodiment of the present disclosure, in a case where the base station 100 (processing unit 140) continuously allocates the uplink resource to the UE 200, the base station 100 (processing unit 140) may transmit resource use information related to the use of the uplink resource to a neighbor base station. The resource use information may indicate the uplink resource. The neighbor base station may refrain from using the uplink resource on the basis of the resource use information.

For example, in a case where the UE 200 is located close to the boundary between the coverage area of the base station 100 and the coverage area of the neighbor base station, the base station 100 (processing unit 140) may transmit the resource use information to the neighbor base station.

Further, the base station 100 (processing unit 140) may transmit resource disuse information related to the disuse of the uplink resource to the neighbor base station upon receiving the first flag information. The resource disuse information may indicate the uplink resource. The neighbor base station may resume using the uplink resource on the basis of the resource disuse information.

This, for example, makes it possible to effectively use a resource while reducing interference between cells.

(10) Tenth Modification Example: System

In the above-described example of the embodiment of the present disclosure, the system 1 is a system compliant with the TSs of 5G or NR. However, the system 1 according to the embodiment of the present disclosure is not limited to this example.

In the tenth modification example of the embodiment of the present disclosure, the system 1 may be a system compliant with other TSs in 3GPP. As an example, the system 1 may be a system compliant with the TSs of long term evolution (LTE), LTE Advanced (LTE-A), or 4G and the base station 100 may be an evolved Node B (eNB). Alternatively, the base station 100 may be a ng-eNB. As another example, the system 1 may be a system compliant with the TSs of 3G and the base station 100 may be a Node B. As yet another example, the system 1 may be a system compliant with next generation (for example, 6G) TSs.

Alternatively, the system 1 may be a system compliant with TSs of another standardization organization for mobile communications.

While an embodiment of the present disclosure have been described above, the present disclosure is not limited to the embodiment. It will be understood by those skilled in the art that the embodiment is merely an example and various changes can be made without departing from the scope and the spirit of the present disclosure.

For example, steps in a process described in the present specification do not necessarily have to be executed chronologically in the order described in the flowchart or the sequence diagram. For example, steps in a process may be executed in an order different from the order described as the flowchart or the sequence diagram, or may be executed in parallel. In addition, one or more steps in a process may be removed, or one or more further steps may be added to the process.

For example, there may be provided a method including the operations of one or more components of an apparatus described in the present specification, and there may be provided a program for causing a computer to execute the operations of the components. Moreover, there may be provided a non-transitory tangible computer-readable storage medium having stored therein the program. Naturally, such a method, program, and non-transitory tangible computer-readable storage medium are also included in the present disclosure.

For example, in the present disclosure, a user equipment (UE) may be referred to by another name such as mobile station, mobile terminal, mobile device, mobile unit, subscriber station, subscriber terminal, subscriber device, subscriber unit, wireless station, wireless terminal, wireless device, wireless unit, remote station, remote terminal, remote device, or remote unit.

For example, in the present disclosure, "transmit" may mean performing processing of at least one layer in a protocol stack used for transmission, or physically transmitting signals wirelessly or by wire. Alternatively, "transmit" may mean a combination of performing the processing of the at least one layer and physically transmitting signals wirelessly or by wire. Similarly, "receive" may mean performing processing of at least one layer in a protocol stack used for reception, or physically receiving signals wirelessly or by wire. Alternatively, "receive" may mean a combination of performing the processing of the at least one layer and physically receiving signals wirelessly or by wire.

For example, in the present disclosure, "obtain/acquire" may mean obtaining/acquiring information from stored information, obtaining/acquiring information from information received from another node, or obtaining/acquiring information by generating the information.

For example, in the present disclosure, "include" and "comprise" do not mean that only listed items are included, but mean that only listed items may be included or a further item may be included in addition to the listed items.

For example, in the present disclosure, "or" does not mean exclusive OR, but means inclusive OR.

Note that the technical features included in the above-described embodiment may be represented as the following features. Naturally, the present disclosure is not limited to the following features.

(Feature 1)

A user equipment (200) comprising:

a reception processing section (231) configured to receive, from a base station (100), configuration information (43) for continuously allocating an uplink resource (50) to the user equipment; and a transmission processing section (233) configured to transmit, to the base station, flag information (63) indicating that the user equipment is not to use the uplink resource in a period after a configured offset.

(Feature 2)

The user equipment according to Feature 1, wherein the transmission processing section is configured to transmit data to the base station using the uplink resource and configured not to transmit data to the base station using the uplink resource in the period.

(Feature 3)

The user equipment according to Feature 1 or 2, wherein the configuration information is configuration information for a configured grant.

(Feature 4)

The user equipment according to any one of Features 1 to 3, wherein the reception processing section is configured to receive a radio resource control (RRC) message including the configuration information from the base station.

(Feature 5)

The user equipment according to any one of Features 1 to 3, wherein the configuration information includes first configuration information and second configuration information, and the reception processing section is configured to receive a radio resource control (RRC) message including the first configuration information from the base station and configured to receive downlink control information (DCI) including the second configuration information from the base station.

(Feature 6)

The user equipment according to any one of Features 1 to 5, wherein the transmission processing section is configured to transmit the flag information to the base station in a slot having the uplink resource.

(Feature 7)

The user equipment according to Feature 6, wherein the transmission processing section is configured to transmit the flag information to the base station using part of the uplink resource in a slot.

(Feature 8)

The user equipment according to Feature 7, wherein the transmission processing section is configured to transmit data to the base station using a remainder of the uplink resource in the slot.

(Feature 9)

The user equipment according to Feature 7 or 8, wherein the part of the uplink resource in the slot is a resource at a specific location in the uplink resource in the slot.

(Feature 10)

The user equipment according to Feature 9, wherein the reception processing section is configured to receive resource location information indicating the specific location.

(Feature 11)

The user equipment according to Feature 10, wherein the resource location information is included in the configuration information.

(Feature 12)

The user equipment according to any one of Features 7 to 11, wherein the transmission processing section is configured to transmit the flag information to the base station on a physical uplink shared channel (PUSCH) or a physical channel for the flag information.

(Feature 13)

The user equipment according to any one of Features 1 to 6, wherein the transmission processing section is configured to transmit the flag information to the base station using another uplink resource different from the uplink resource.

(Feature 14)

The user equipment according to Feature 13, wherein the transmission processing section is configured to transmit the flag information to the base station on a physical uplink control channel (PUCCH) or a physical channel for the flag information.

(Feature 15)

The user equipment according to Feature 13 or 14, wherein the reception processing section is configured to receive, from the base station, other configuration information for allocating the other uplink resource to the user equipment.

(Feature 16)

The user equipment according to any one of Features 1 to 15, wherein the reception processing section is configured to receive, from the base station, offset information indicating the configured offset.

(Feature 17)

The user equipment according to Feature 16, wherein the offset information is included in the configuration information.

(Feature 18)

The user equipment according to any one of Features 1 to 15, wherein the transmission processing section is configured to transmit, to the base station, offset information indicating the configured offset.

(Feature 19)

The user equipment according to any one of Features 1 to 18, wherein the configured offset is an offset that is determined depending on a delay acceptable to the user equipment.

(Feature 20)

The user equipment according to any one of Features 1 to 19, wherein the configured offset is two or more slots.

(Feature 21)

The user equipment according to any one of Features 1 to 19, wherein the configured offset is an offset up to an N-th slot having the uplink resource, and N is a configured integer and is greater than or equal to 1.

(Feature 22)

The user equipment according to any one of Features 1 to 21, wherein the reception processing section is configured to receive, from the base station, period information indicating length of the period.

(Feature 23)

The user equipment according to Feature 22, wherein the period information is included in the configuration information.

(Feature 24)

The user equipment according to any one of Features 1 to 21, wherein the transmission processing section is configured to transmit, to the base station, period information indicating length of the period.

(Feature 25)

The user equipment according to any one of Features 1 to 24, wherein the length of the period is length that is determined depending on a delay acceptable to the user equipment.

(Feature 26)

The user equipment according to any one of Features 1 to 25, wherein the period is a period of one or more slots.

(Feature 27)

The user equipment according to any one of Features 1 to 25, wherein the period is a period including M slots each having the uplink resource, and M is a configured integer and is greater than or equal to 1.

(Feature 28)

The user equipment according to any one of Features 1 to 27, wherein the transmission processing section is also configured to transmit, to the base station, other flag information (61) indicating that the user equipment is to use the uplink resource in the period after the configured offset.

(Feature 29)

The user equipment according to any one of Features 1 to 28, wherein the transmission processing section is configured to transmit the flag information to the base station when a buffer (70) for an uplink has no data.

(Feature 30)

A base station (100) comprising:

a transmission processing section (141) configured to transmit, to a user equipment (200), configuration information (43) for continuously allocating an uplink resource (50) to the user equipment; and a reception processing section (143) configured to receive, from the user equipment, flag information (63) indicating that the user equipment is not to use the uplink resource in a period after a configured offset.

(Feature 31)

The base station according to Feature 30, wherein the transmission processing section is configured to transmit, to another user equipment (30), resource allocation information (47, 49) for allocating at least part of the uplink resource in the period to the other user equipment.

(Feature 32)

The base station according to Feature 30 or 31, wherein the transmission processing section is configured to transmit a radio resource control (RRC) message including the configuration information to the user equipment.

(Feature 33)

The base station according to Feature 30 or 31, wherein the configuration information includes first configuration information and second configuration information, and the transmission processing section is configured to transmit a radio resource control (RRC) message including the first configuration information to the user equipment and configured to transmit downlink control information (DCI) including the second configuration information to the user equipment.

(Feature 34)

The base station according to any one of Features 30 to 33, wherein the transmission processing section is configured to transmit, to the user equipment, offset information indicating the configured offset.

(Feature 35)

The base station according to any one of Features 30 to 34, wherein the transmission processing section is configured to transmit, to the user equipment, period information indicating length of the period.

(Feature 36)

A method performed by a user equipment (200), comprising:

receiving, from a base station (100), configuration information (43) for continuously allocating an uplink resource (50) to the user equipment; and transmitting, to the base station, flag information (63) indicating that the user equipment is not to use the uplink resource in a period after a configured offset.

(Feature 37)

A method performed by a base station (100), comprising:

transmitting, to a user equipment (200), configuration information (43) for continuously allocating an uplink resource (50) to the user equipment; and receiving, from the user equipment, flag information (63) indicating that the user equipment is not to use the uplink resource in a period after a configured offset.

(Feature 38)

A program for causing a computer to execute:

receiving, from a base station (100), configuration information (43) for continuously allocating an uplink resource (50) to a user equipment (200); and transmitting, to the base station, flag information (63) indicating that the user equipment is not to use the uplink resource in a period after a configured offset.

(Feature 39)

A program for causing a computer to execute:

transmitting, to a user equipment (200), configuration information (43) for continuously allocating an uplink resource (50) to the user equipment; and receiving, from the user equipment, flag information (63) indicating that the user equipment is not to use the uplink resource in a period after a configured offset.

(Feature 40)

A non-transitory tangible computer-readable storage medium having stored therein a program for causing a computer to execute:

receiving, from a base station (100), configuration information (43) for continuously allocating an uplink resource (50) to a user equipment (200); and transmitting, to the base station, flag information (63) indicating that the user equipment is not to use the uplink resource in a period after a configured offset.

(Feature 41)

A non-transitory tangible computer-readable storage medium having stored therein a program for causing a computer to execute:

transmitting, to a user equipment (200), configuration information (43) for continuously allocating an uplink resource (50) to the user equipment; and receiving, from the user equipment, flag information (63) indicating that the user equipment is not to use the uplink resource in a period after a configured offset.

What is claimed is:

1. A terminal comprising:

a memory storing a program; and one or more processors configured to execute the program to:

receive, from a base station, a radio resource control message including information for configuring a periodicity of a physical uplink shared channel resource for a configured grant transmission; and transmit on the physical uplink shared channel resource, to the base station, information indicating that the terminal does not use the physical uplink shared channel resource in the periodicity of the configured grant transmission in a case that the terminal does not transmit uplink data on the physical uplink shared channel resource.

2. The terminal according to claim 1, wherein the one or more processors are configured to execute the program to transmit uplink data to the base station using the physical uplink shared channel resource and not to transmit uplink data to the base station using the physical uplink shared channel resource indicated by the information indicating that the terminal does not use the physical uplink shared channel resource.

3. A base station comprising:

a memory storing a program; and one or more processors configured to execute the program to:

transmit, to a terminal, a radio resource control message including information for configuring a periodicity of a physical uplink shared channel resource for a configured grant transmission; and receive, from the terminal, information indicating that the terminal does not use the physical uplink shared channel resource in the periodicity of the configured grant transmission in a case that the terminal does not transmit uplink data on the physical uplink shared channel resource.

4. The base station according to claim 3, wherein the one or more processors are configured to execute the program to receive uplink data from the terminal using the physical uplink shared channel resource and not to receive uplink data from the UE using the physical uplink shared channel resource indicated by the information indicating that the terminal does not use the physical uplink shared channel resource.

5. A method performed by a terminal comprising:

receiving, from a base station, a radio resource control message including information for configuring a periodicity of a physical uplink shared channel resource for a configured grant transmission; and transmitting on the physical uplink shared channel resource, to the base station, information indicating that the terminal does not use the physical uplink shared channel resource in the periodicity of the configured grant transmission in a case that the terminal does not transmit uplink data on the physical uplink shared channel resource.

6. The method according to claim 5, further comprising:

transmitting uplink data to the base station using the physical uplink shared channel resource and not transmitting uplink data to the base station using the physical uplink shared channel resource indicated by the information indicating that the terminal does not use the physical uplink shared channel resource.

* * * * *